(12) United States Patent
Tiecher

(10) Patent No.: US 12,454,984 B2
(45) Date of Patent: Oct. 28, 2025

(54) SYSTEM FOR ADJUSTING BEARINGS FOR POULTRY OFFAL PROCESSING MACHINES

(71) Applicant: Mauro Tiecher, Chapecó (BR)

(72) Inventor: Mauro Tiecher, Chapecó (BR)

( * ) Notice: Subject to any disclaimer, the term of this patent is extended or adjusted under 35 U.S.C. 154(b) by 393 days.

(21) Appl. No.: 18/020,669

(22) PCT Filed: Dec. 31, 2020

(86) PCT No.: PCT/BR2020/050639
§ 371 (c)(1),
(2) Date: Feb. 10, 2023

(87) PCT Pub. No.: WO2022/040763
PCT Pub. Date: Mar. 3, 2022

(65) Prior Publication Data
US 2023/0304535 A1    Sep. 28, 2023

(30) Foreign Application Priority Data
Aug. 24, 2020    (BR) ...................... 10 2020 017279 4

(51) Int. Cl.
*F16C 43/02*    (2006.01)
*A22C 21/06*    (2006.01)

(52) U.S. Cl.
CPC .............. *F16C 43/02* (2013.01); *A22C 21/06* (2013.01)

(58) Field of Classification Search
CPC ............................. A22C 21/06; A22C 21/0061
USPC ........................................................ 452/179
See application file for complete search history.

(56) References Cited

U.S. PATENT DOCUMENTS

| | | | |
|---|---|---|---|
| 4,570,296 A * | 2/1986 | Hill ...................... | A22C 21/06 452/114 |
| RE32,402 E * | 4/1987 | Graham ................ | A22C 21/06 452/117 |
| 5,930,898 A | 8/1999 | Lyon | |
| 6,052,902 A | 4/2000 | Lyon | |

FOREIGN PATENT DOCUMENTS

| | | |
|---|---|---|
| BR | 8203073 | 8/2004 |
| BR | 8301639 | 4/2005 |
| BR | MU8403126 | 8/2006 |
| BR | MU8601815 | 4/2008 |
| BR | MU8702054 | 8/2009 |
| BR | 202015018345 | 2/2017 |
| BR | 202016020834 | 3/2018 |

(Continued)

OTHER PUBLICATIONS

International Search Report for PCT/BR2020/050639 dated May 3, 2021.

*Primary Examiner* — Richard T Price, Jr.
(74) *Attorney, Agent, or Firm* — B. Aaron Schulman, Esq.; Stites & Harbison, PLLC

(57) ABSTRACT

Bearing adjustment system installed in a machine for processing poultry giblets. The system comprises at least one first bearing assembly and at least one second bearing assembly, for easy adjustment of the position of different specific components of the machine that are installed in these bearing assemblies. The system also comprises parallel guiding rails for sliding a first body of the first bearing assembly. The system comprises at least a single guiding rail for sliding a second body of a second bearing assembly.

9 Claims, 4 Drawing Sheets

(56) References Cited

FOREIGN PATENT DOCUMENTS

| | | |
|---|---|---|
| BR | 202017012153 | 12/2018 |
| BR | 20201706221 | 3/2019 |
| CN | 106234549 | 12/2016 |
| CN | 110250256 | 9/2019 |
| WO | WO0057072 | 12/2001 |

* cited by examiner

SYSTEM FOR ADJUSTING BEARINGS FOR POULTRY OFFAL PROCESSING MACHINES

BACKGROUND OF THE INVENTION

The present invention relates to a bearing adjustment system for apparatuses intended to process poultry giblets, particularly to promote easy access to the apparatus element bearings that act in the giblets processing of slaughtered birds, such as gizzards, hearts and/or similar from chickens, turkeys, hens or other poultry for slaughter.

Apparatuses for poultry giblets processing are well known for those of ordinary skill in the art of poultry processing, and the components of these apparatuses that operate in the giblets processing are supported by static bearings, fixed by screws installed in regions of difficult access inside these apparatuses.

These apparatuses were developed to fulfill with safety requirements, to avoid work accidents, as well as to reduce the need of manual labor during the selection and cleaning of giblets from slaughtered birds, which are widely marketed in the food industry worldwide. Thus, for such giblets to be marketed properly and with increased added value, after the extraction of the giblets from the carcasses of slaughtered birds, it is necessary to remove residual parts attached to the giblets.

Initially, the processing of these giblets was performed manually by human labor, to clean each piece individually, resulting in low productivity, high rate of repetitive strain injuries (RSI), and work accidents.

Therefore, apparatuses were developed to automate poultry giblets processing, and the removal of residual parts of the giblets is performed by a variety of components that act at different stages during this cleaning process.

Some examples of apparatuses designed to fulfill different specific functions, within the scope of giblets processing, are presented by the Brazilian patent documents BRMU8203073-1, BR202015018345-9, BR202016020834-9 and BR202017012153-0, all owned by the same applicant of this invention. Such documents present specific improvements in the apparatuses and devices used for cleaning giblets.

Nevertheless, despite visible improvements in the automation of the giblets cleaning processes, the applicant, continuing his studies in the field, envisioned the possibility of developing a bearing adjustment system aiming to facilitate the assembly, operation adjustment and maintenance of the specific bearings of the various components installed in these machines.

Thus, disadvantageously, current bearing systems are positioned in hard-to-reach places in the apparatuses where they are applied, and it is often necessary to remove other components from the apparatus to gain access to the component bearings.

In addition, disadvantageously, the difficulty of accessing the bearings greatly impairs their positioning adjustment, as it is necessary to loosen all the screws, to perform the repositioning of the bearings and then retighten the screws.

An example of a bearing designed to be used in different types of apparatuses is presented by the Brazilian patent document BR0009153A, which describes a bearing designed to absorb forces from different directions, radially, while a rail is provided to allow its longitudinal displacement.

However, disadvantageously, this bearing has a complex assembly and operation, and does not provide an easy access to the leading screw device for adjusting the bearing position. Moreover, it is not suitable to be applied in poultry processing, as such apparatuses do not depend on a bearing designed to absorb radial forces.

In addition, disadvantageously, this bearing cannot be applied to apparatuses for poultry giblets processing, as they depend on an unobstructed upper access for adjustment of various components that need to be moved throughout the apparatus.

In order to solve these inconveniences from the state of the art, the present invention proposes a bearing adjustment system for poultry giblets processing apparatuses, which provides a set of bearings installed in easy access positions inside the apparatus, and the position of each bearing is adjusted through access to a single leading screw element moved by a key.

Thus, it is an objective of the present invention to provide a bearing adjustment system for poultry giblets processing apparatuses, wherein bearings are moved throughout guiding rails fixed to the structure of the apparatus.

Advantageously, the present invention introduces a bearing adjustment system for poultry giblets processing apparatuses, with simple and efficient design, resulting in productivity gains in the apparatuses setup and maintenance.

Schematic drawings of a particular embodiment of the invention can herein be seen. The dimensions and proportions presented in these schemes are not necessarily the real ones, as the drawings are only intended to didactically present its various aspects. The scope of protection is determined only by the scope of this document claims.

DESCRIPTION OF THE INVENTION

As represented by the accompanying drawings, the bearing adjustment system S is installed in a machine M for processing poultry giblets (not shown), such as gizzards, hearts, or other types of giblets.

In the embodiment of the invention illustrated by the accompanying drawings, the machine M is configured by a poultry giblets cleaning apparatus. However, it can be understood that said machine M can be configured by different types of apparatuses, capable of fulfilling different specific functions within the scope of poultry giblets processing, without deviating from the protection scope of the claims here presented.

Figure 1:
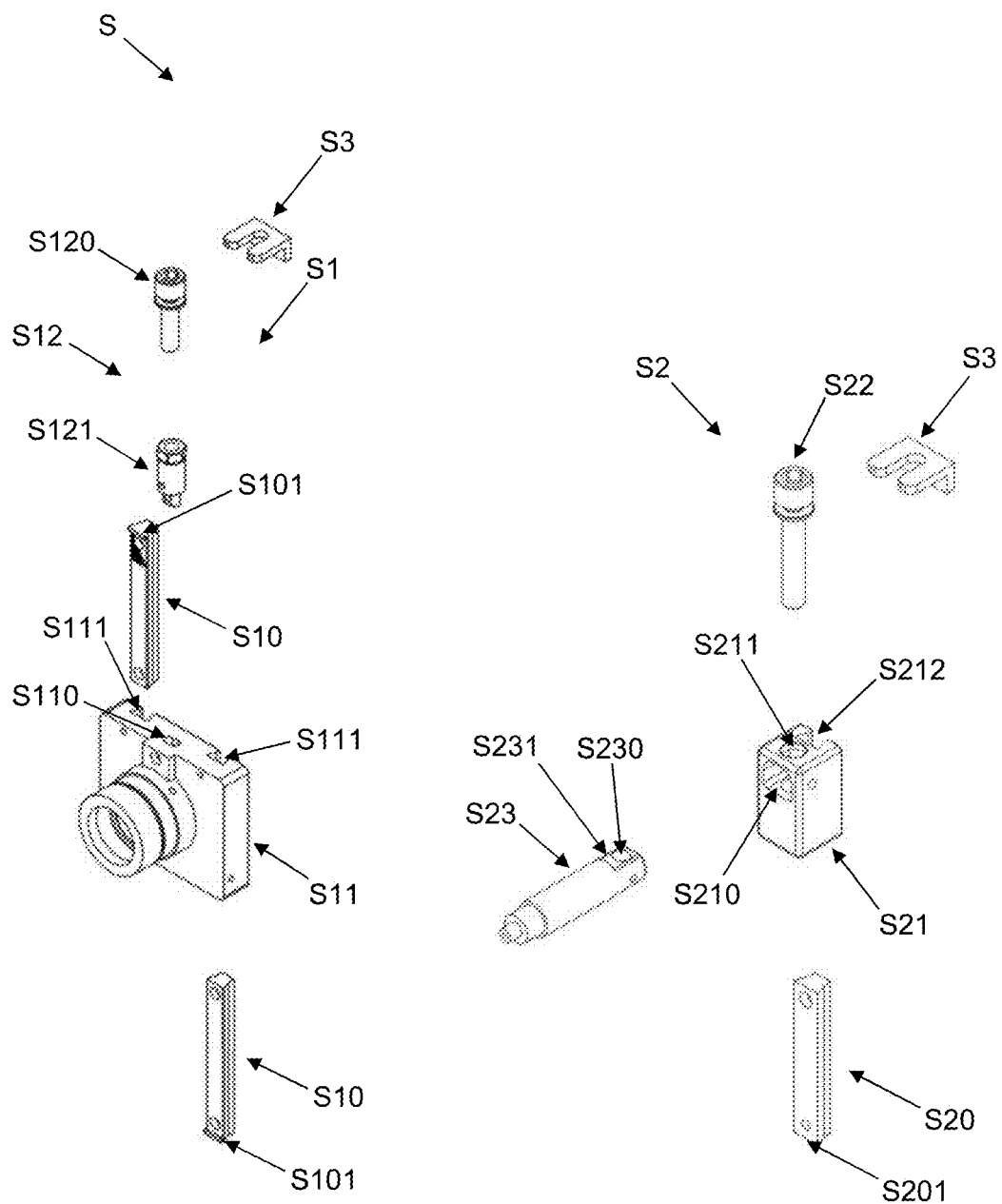
FIG. 1 illustrates an exploded perspective view of the system S, showing a first bearing assembly S1 and a second bearing assembly S2.
Figure 2:
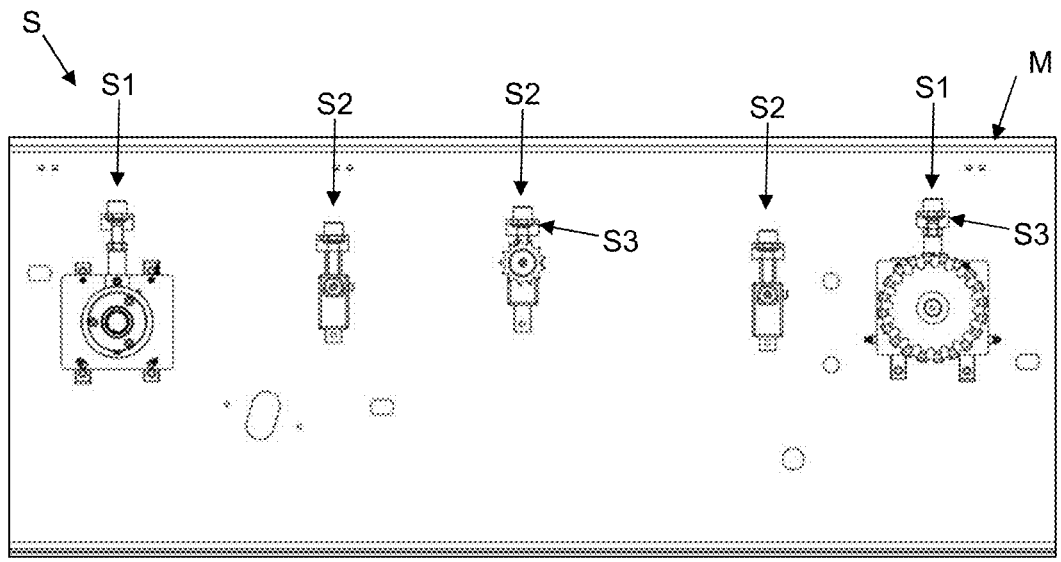
FIG. 2 illustrates a partial schematic front view of an application of the system S embodiment, showing two first bearing assemblies S1 and three second bearing assemblies S2 installed in a machine M.
Figure 3:
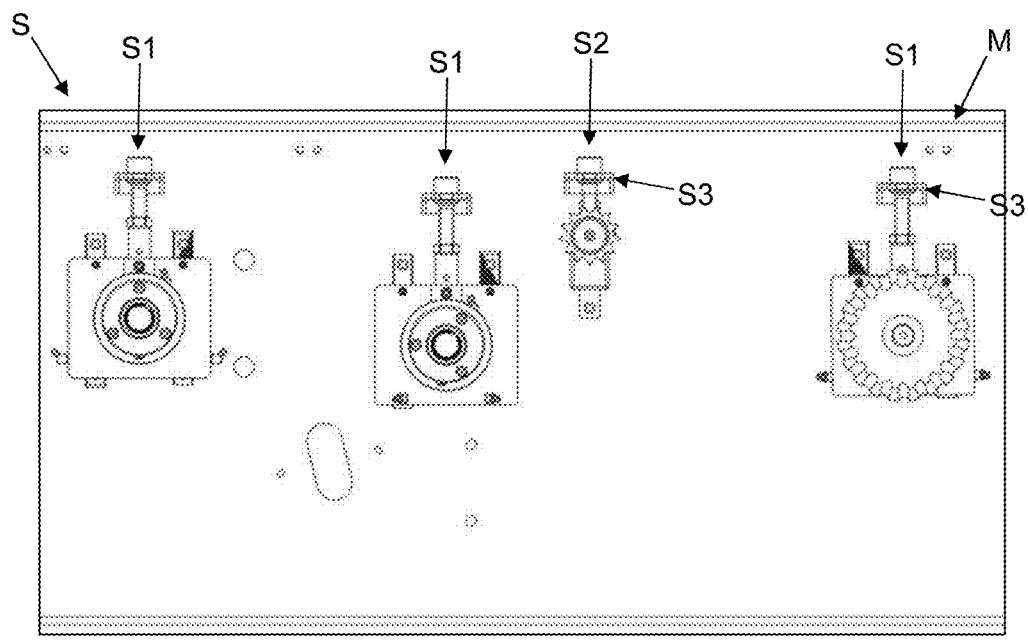
FIG. 3 illustrates a partial schematic front view of an application of the system S embodiment, showing the installation of three first bearing assemblies S1 and a second bearing assembly S2 in a machine M.
Figure 4:
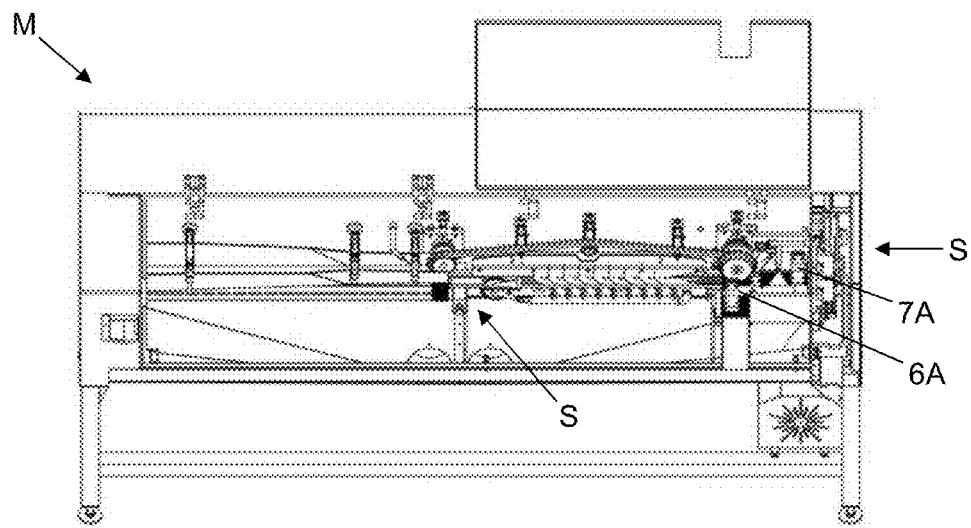
FIG. 4 illustrates a front perspective view of an embodiment of an application of the system S in a machine M.
Figure 5:
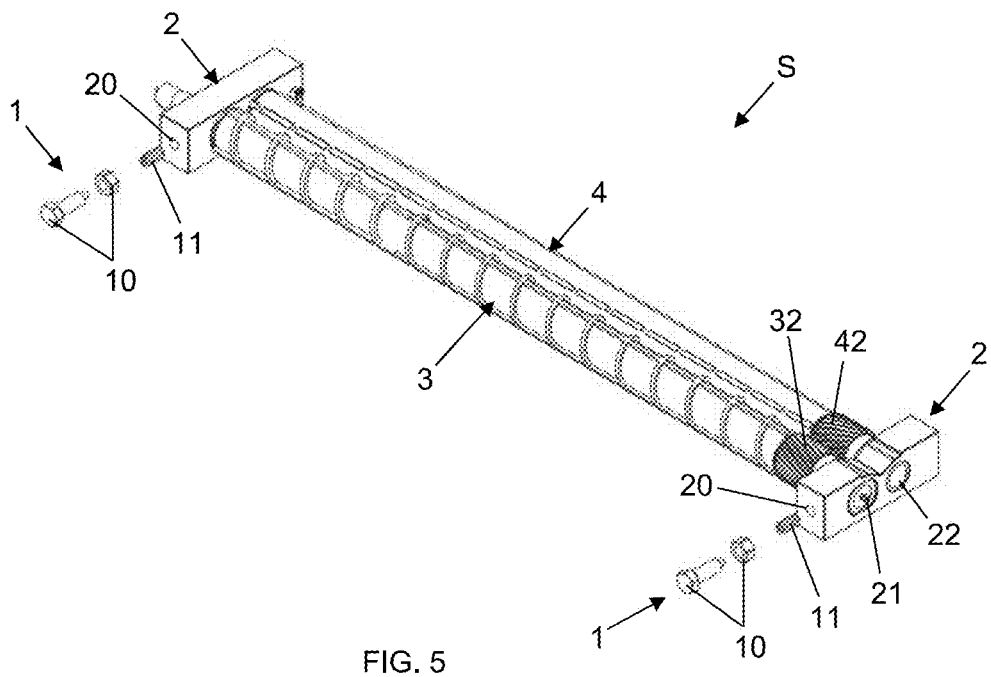
FIG. 5 illustrates a perspective view of a preferred embodiment of the system S.

As illustrated by FIG. 1, the system S comprises at least one first bearing assembly S1 and at least one second bearing assembly S2, for easy adjustment of different specific components positions of the machine M that are installed in the bearings assemblies S1 and S2. Thus, depending on the configurations of the machine M, as exemplified by FIGS. 2 and 3, the system S may comprise different quantities of first bearing assemblies S1 and second bearing assemblies S2.

Moreover, as illustrated in FIG. 1, the system S comprises parallel guiding rails S10 for sliding a first body S11 of the first bearing assembly S1 so that said first body S11 can be easily moved throughout these parallel guiding rails S10.

Thus, each parallel guiding rail S10 is conveniently fixed to the machine M, and the first body S11 can be moved throughout the parallel guiding rails S10 by the triggering of a first lead screw device S12, which can be easily accessed by an operator (not shown), from the front of the machine M and without the need to remove other components from the apparatus, except their respective protective covers (not shown).

The first body S11 comprises a hole S110 to connect the first body S11 to the first lead screw device S12. Furthermore, preferably, the first lead screw device S12 comprises a triggering element S120, such as a screw, supported on a retaining support S3 fixed to the machine M. The body of the triggering element S120 passes through the retaining support S3, and it is fixed to a connecting element S121, such as a threaded sleeve.

Said connecting element S121 is conveniently statically fixed in the hole S110 of the first body S11 so that the rotation of the triggering element S120 results in the movement of the connecting element S121 throughout the triggering element S120, moving the first body S11 with it.

As illustrated by FIG. 1, the first body S11 comprises parallel ducts S111 to receive the parallel guiding rails S10. Said parallel ducts S111 and parallel guiding rails S10 shapes are complementary to each other, promoting proper fitting and allowing the parallel ducts S111 to slide throughout the parallel guiding rails S10.

Preferably, both parallel ducts S111 and parallel guiding rails S10 have a trapezoidal shape, facilitating the fitting between themselves and allowing the vertical movement of the first body S11, while preventing orthogonal movements of the first body S11 relative to the parallel guiding rails S10.

Furthermore, as illustrated by FIG. 1, the parallel guiding rails S10 comprise first limit stops S101 limiting the movement of the first body S11. Moreover, preferably, each parallel guiding rail S10 comprises a single first limit stop S101. As an embodiment of the invention, a parallel guiding rail S10 may comprise an upper first limit stop S101, while another parallel guiding rail S10 may comprise a lower first limit stop S101.

Additionally, as illustrated by FIG. 1, the system S comprises at least one single guiding rail S20 of a second body S21 of a second bearing assembly S2, in a manner that this second body S21 can be easily moved throughout this single guiding rail S20.

Thus, the single guiding rail S20 is conveniently fixed to the machine M, and the second body S21 can be moved throughout the single guiding rail S20 by the triggering of the second lead screw device S22, which can also be easily accessed by an operator (not shown) from the front of the machine M and without the need of removing other components from the apparatus, aside from their respective protective covers (not shown).

As illustrated by FIG. 1, the second body S21 comprises a connecting horizontal hole S210 to the beveled end S231 of a shaft S23, in order to prevent rotational movements of said shaft S23 inside the horizontal hole S210.

Furthermore, this beveled end S231 is provided with a first vertical hole S230, while the second body S21 comprises a second vertical hole S211 that communicates with the horizontal hole S210, which is aligned with the first vertical hole S230, in the shaft S23 mounting position through the horizontal hole S210.

Therefore, when the shaft S23 is inserted inside the horizontal hole S210, the two vertical holes S230 and S211 assume positions aligned with each other, allowing the shaft S23 to be connected with the second lead screw device S22.

Said second lead screw device S22 is preferably configured by a screw, which is supported on a retaining support S3 fixed to the machine M so that its head is supported on said retaining support S3 while its body crosses it and the second vertical hole S211, allowing it to connect with the first vertical hole S230 of the shaft S23.

Thus, the second lead screw device S22, such as a screw, is conveniently fixed and, preferably, threaded, in the vertical hole S230 of the shaft S23 so that the rotation of the second lead screw device S22 results in the vertical movement of the shaft S23, moving the second body S21 with it as well.

As illustrated by FIG. 1, the second body S21 comprises a single duct S212 for receiving the single guiding rail S20. The single duct S212 and the single guiding rail S20 shapes are complementary to each other, promoting proper fitting and allowing the single duct S212 to slide throughout the single guiding rail S20.

Preferably, both the single duct S212 and the single guiding rail S20 have a trapezoidal shape, facilitating the fitting between themselves and allowing the vertical movement of the second body S21, while preventing orthogonal movements of the second body S21 relative to the single guiding rail S20.

Furthermore, as illustrated by FIG. 1, the single guiding rail S20 comprises at least a second limit stop S201 limiting the movement of the second body S21. Moreover, preferably, the single guiding rail S20 comprises a single second limit stop S201. As an embodiment of the invention, the single guiding rail S20 may comprise a lower second limit stop S201.

Figure 6:
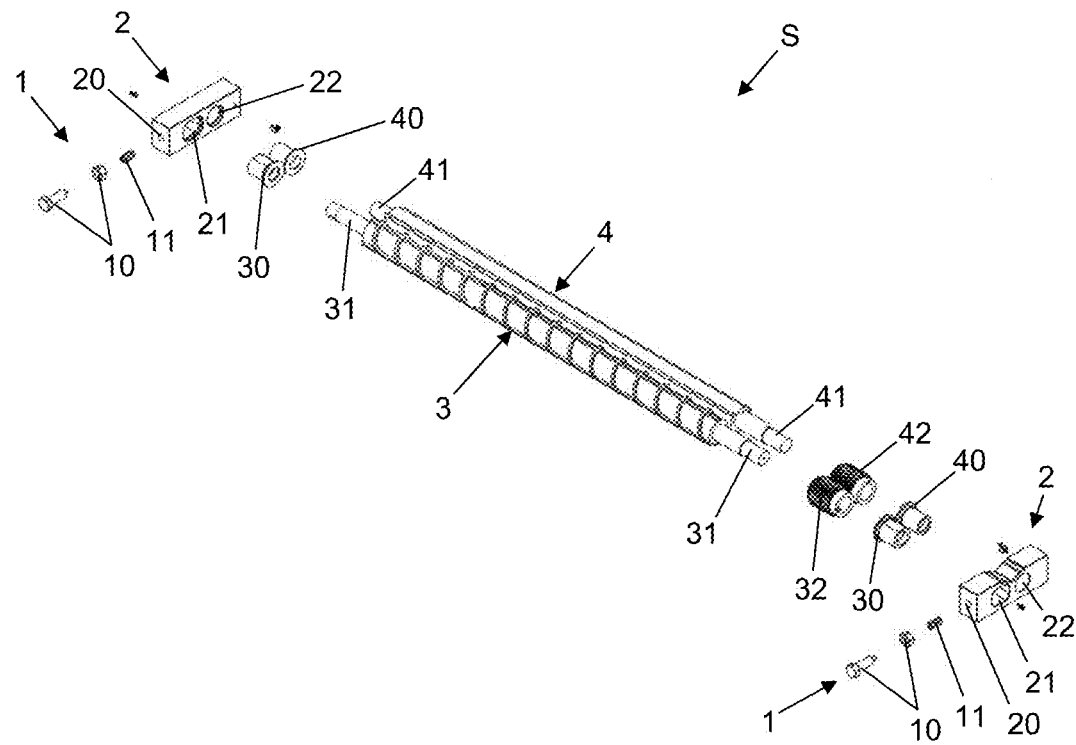
FIG. 6 illustrates an exploded perspective view of a preferred embodiment of the system S.

As illustrated by FIG. 6, optionally, the system S, additionally, may comprise adjusting devices 1 installed on a pair of self-compensating bearing assemblies 2 to promote adjustment of the position and relative distance between a first pre-cleaning roller 3 and a second pre-cleaning roller 4 of the giblets (not shown). Said pre-cleaning rollers 3 and 4 rotate against each other to conveniently remove residual parts of the giblets (not shown).

The adjusting devices 1 are frontally positioned in the machine M, in such a way that an operator (not shown) can have easy access to it, and without the hindering from any machine M component to this access. Thus, said adjusting devices 1 are set to establish a convenient distance between the pre-cleaning rollers 3 and 4, according to each application needed.

In an embodiment of the invention, in gizzard cleaning applications (not shown), the distance between the pre-cleaning rollers 3 and 4 may vary according to the dimensions of these gizzards (not shown). It is well known for those of ordinary skill in the art of poultry processing that gizzards (not shown) begin to wilt after just a few hours since the slaughter of the birds.

Thus, the time required to transport the gizzards (not shown) from the slaughterhouse to the processing facilities, where they are processed, directly influences the dimensions of these gizzards (not shown) and, consequently, requires adjustment in the distance between the pre-cleaning rollers 3 and 4, thereby processing the gizzards (not shown) with higher quality and productivity.

Moreover, as illustrated by FIG. 6, each self-compensating bearing assembly 2 comprises a duct 20 that accommodates an adjusting device 1 of the position of the first pre-cleaning roller 3.

Therefore, the adjusting devices 1 allow the self-compensating bearing assemblies 2 to provide a shift in the position of the first pre-cleaning roller 3, which moves relative to the second pre-cleaning roller 4 whenever it is necessary, in a manner that the adjusting devices 1 themselves force the first pre-cleaning roller 3 to return to its initial position as soon as possible.

This displacement of the position of the first pre-cleaning roller 3 occurs mainly when the giblets (not shown) contain, inside of them, small solid objects, such as stones or metals previously swallowed by the slaughtered birds (not shown).

Thus, the self-compensating bearing assemblies 2 allow the first pre-cleaning roller 3 to move away from the second pre-cleaning roller 4 when they act to remove these solid objects from the interior of the giblets (not shown), preventing the pre-cleaning rollers 3 and 4 from get stuck. Similarly, as soon as the solid objects are removed from the interior of the giblets (not shown), the adjusting devices 1 act so that the first pre-cleaning roller 3 approaches the second pre-cleaning roller 4 again.

For this purpose, preferably, as illustrated in FIG. 6, each self-compensating bearing assembly 2 comprises a first oblong hole 21 to accommodate an adapter sleeve 30 which is slidable inside the first oblong hole 21 and receives one end 31 of the first pre-cleaning roller 3.

In addition, the first oblong hole 21 is interconnected with the duct 20 so that each adjusting device 1 is in direct contact with an adapter sleeve 30 for displacement of the first pre-cleaning roller 3 inside the respective self-compensating bearing assembly 2.

Furthermore, preferably, as illustrated in FIG. 6, each adjusting device 1 comprises an adjustable triggering element 10, such as a screw with a nut, capable of regulating its actuation position and its reach inside the duct 20. In addition, each adjusting device 1 also comprises a resilient element 11, such as a spring, arranged in constant contact with the adjustable triggering element 10.

Thus, each resilient element 11 is preferably arranged in contact with an adapter sleeve 30, in such a way that the resilient element 11 allows the adapter sleeve 30 and the first pre-cleaning roller 3 to slide together but forces the adapter sleeve 30 back to its initial position, in the first hole 21 of the self-compensating bearing assembly 2, whenever it is possible.

Furthermore, each self-compensating bearing assembly 2 comprises a hole 22 to accommodate an adapter sleeve 40, which is fixed inside the hole 22 and receives one of the ends 41 of the second pre-cleaning roller 4. Thus, the second pre-cleaning roller 4 rotates around its own axis, without moving inside the self-compensating bearing assemblies 2.

In addition, preferably, the first pre-cleaning roller 3 comprises a cleaning cylinder 32 adjacently arranged to one of the adapter sleeves 30, and the second pre-cleaning roller 4 comprises a cleaning cylinder 42 adjacently arranged to one of the adapter sleeves 40. Thus, the cleaning cylinders 32 and 42 are responsible for effectively removing the residual parts of the giblets (not shown).

Figure 7:
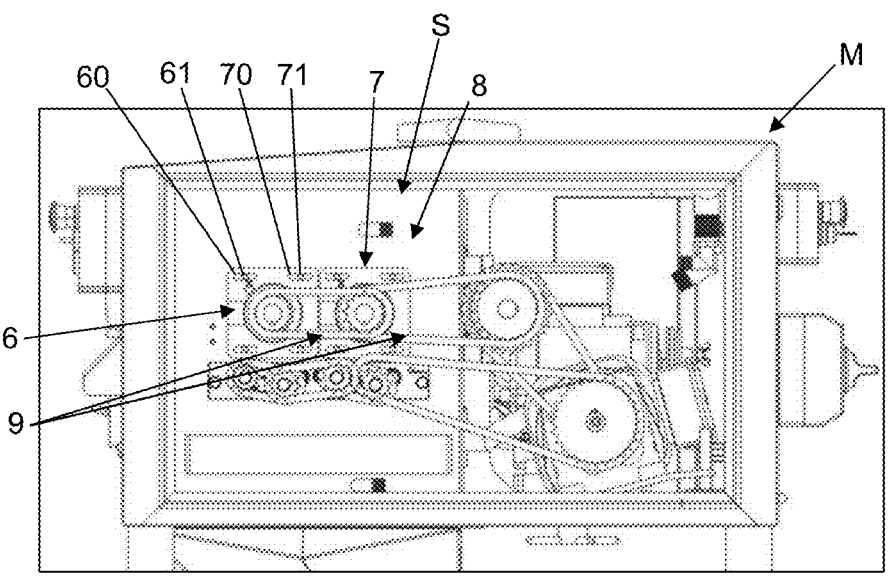
FIG. 7 illustrates a side view of an embodiment of an application of the system S in a machine M.

As illustrated in FIG. 7, depending on the application needs of the system S in each machine M configuration, together with the other components that may be part of the system S, the system S may also comprise a first external bearing 6 of a first guiding element 6A and a second external bearing 7 of a second guiding element 7A. These external bearings 6 and 7 may be installed on the outer side of a side wall 8 of the machine M, in order to facilitate the access of an operator (not shown) during maintenance, mainly to promote the stretching of the belts 9 in a quick and practical way.

For this purpose, preferably, the first external bearing 6 comprises third oblong holes 60 for adjustable installation of fasteners 61 throughout each third oblong hole 60. Similarly, the second external bearing 7 comprises fourth oblong holes 70 for adjustable installation of fasteners 71 throughout each fourth oblong hole 70.

The particular arrangements shown in the drawings should not be viewed as limiting. It should be understood that other embodiments can include more or less of each element shown in a given figure. Further, some of the illustrated elements can be combined or omitted. Yet further, an example embodiment can include elements that are not illustrated in the figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system for adjusting bearings for poultry offal processing machines, wherein the system is installed in a poultry giblets processing machine, the system comprising:
    parallel guiding rails for sliding a first body of a first bearing assembly, wherein
        each parallel guiding rail is fixed to the poultry giblets processing machine, and
        the first body moves throughout the parallel guiding rails by the triggering of a first lead screw device;
    a single guiding rail for sliding a second body of a second bearing assembly, wherein
        the single guiding rail is fixed to the poultry giblets processing machine, and
        the second body moves throughout the single guiding rail by the triggering of a second lead screw device.

2. The system according to claim 1, wherein the first body further comprises a hole connecting the first body with the first lead screw device.

3. The system according to claim 2, wherein the first lead screw device further comprises
    a triggering element supported in a retaining support fixed to the poultry giblets processing machine, wherein
        the triggering element is connected to a connecting element, and the connecting element is mounted in the hole of the first body.

4. The system according to claim 3, wherein the triggering element is a screw.

5. The system according to claim 3, wherein the connecting element is a sleeve.

6. The system according to claim 1, wherein the second body further comprises:
    a horizontal hole connecting the beveled end of a shaft to the second body, wherein
        the beveled end comprises a first vertical hole;

a second vertical hole communicates with the horizontal hole and is aligned with the first vertical hole, in the mounting position of the shaft through the horizontal hole, wherein the shaft is connected to the second lead screw device, which is hold by a second retaining support fixed to the poultry giblets processing machine, wherein the second lead screw device crosses the second vertical hole and connects with the first vertical hole.

7. The system according to claim 1, wherein
the first body further comprises parallel ducts for slidably receiving the parallel guiding rails, and wherein
the second body further comprises a single duct for slidably receiving the single guiding rail.

8. The system, according to claim 1, wherein
the parallel guiding rails further comprises first limit stops for limiting the movement of the first body along the parallel guiding rails, and wherein
the single guiding rail further comprises at least one second limit stop for limiting the movement of the second body along the single guiding rail.

9. The system according to claim 1, wherein the system further comprises:

a first external bearing of a first guiding element;

a second external bearing of a second guiding element, wherein the first external bearing and the second external bearing are installed on the outer side of a side wall of the poultry giblets processing machine, and wherein the first external bearing further comprises oblong holes for adjustable installation of fasteners throughout each third oblong hole, and the second external bearing further comprises oblong holes for adjustable installation of fasteners throughout each fourth oblong hole.

* * * * *